May 2, 1933.　　　　S. MILLER ET AL　　　　1,906,482
VALVE GEAR
Filed April 1, 1930　　　4 Sheets-Sheet 1
— FIG. 1. —
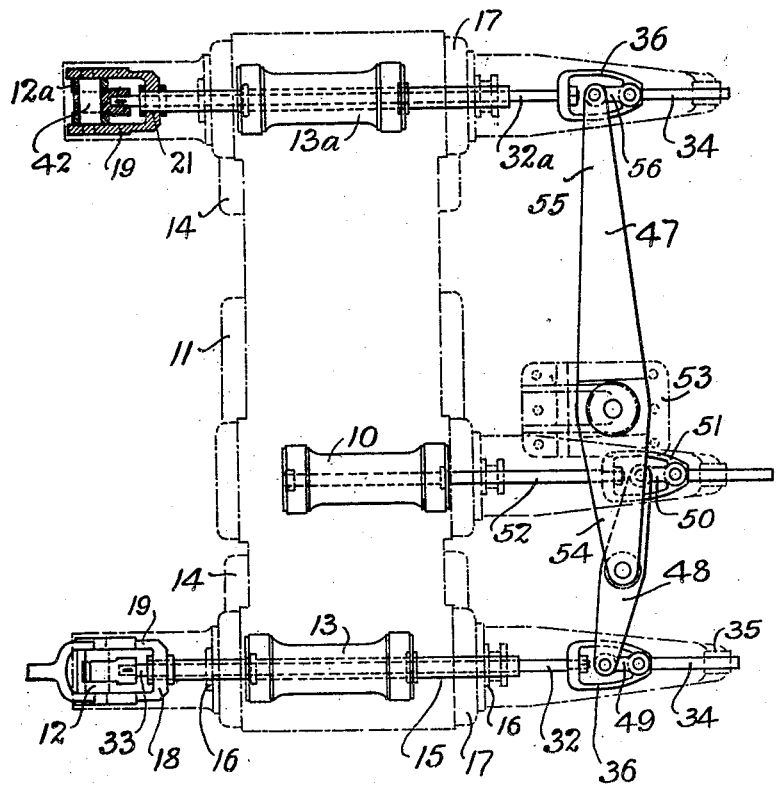
— FIG. 3. —
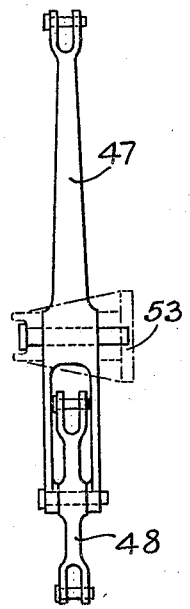
— FIG. 2. —
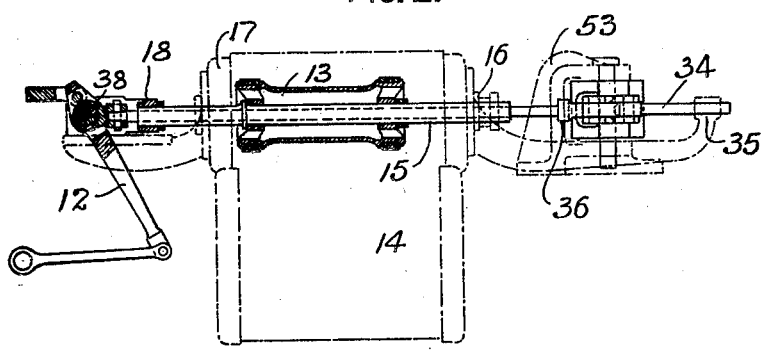
INVENTORS
Sherman Miller
Joshua J. Jones
BY S. O. Yeaton
ATTORNEY

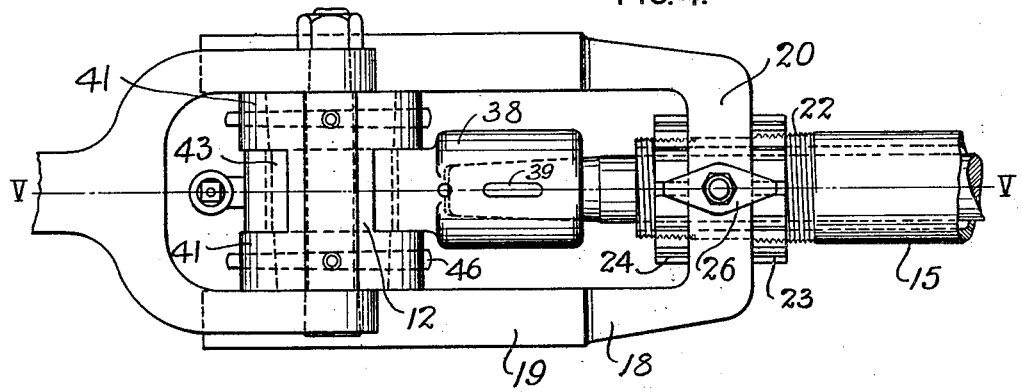
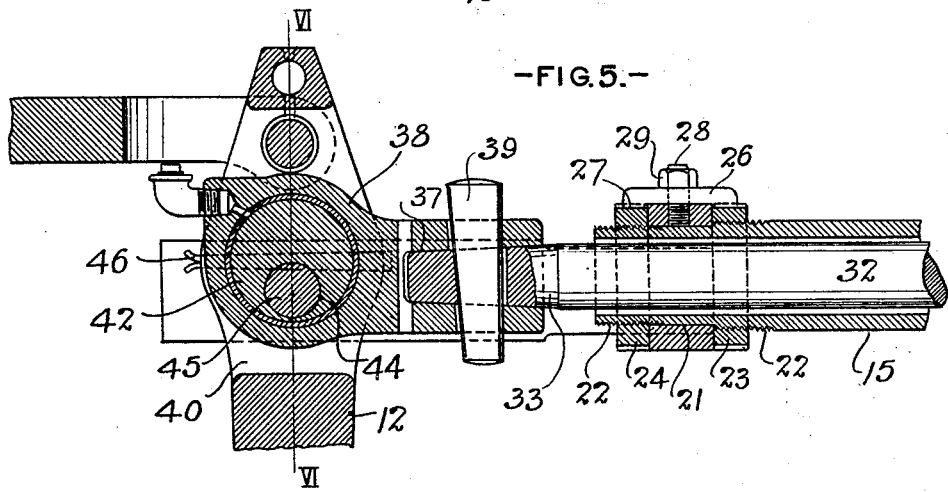
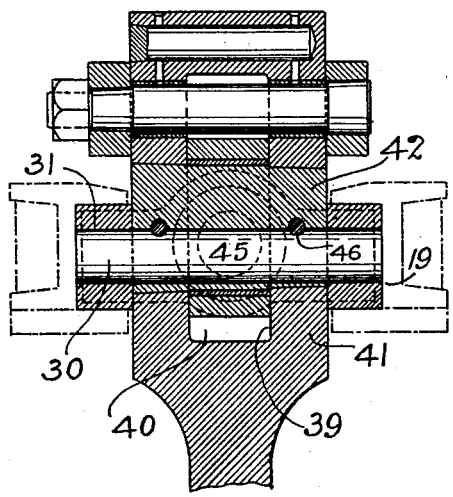
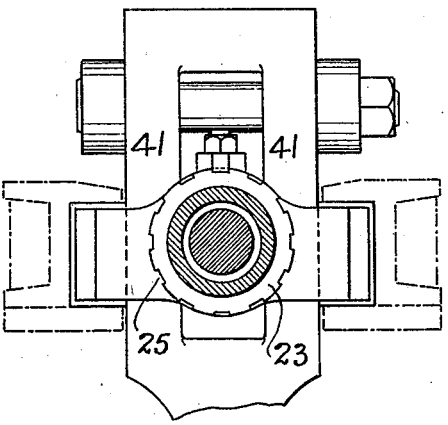

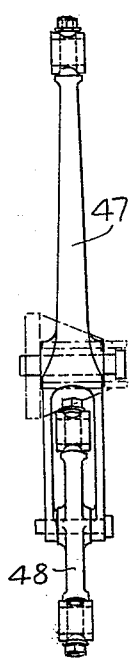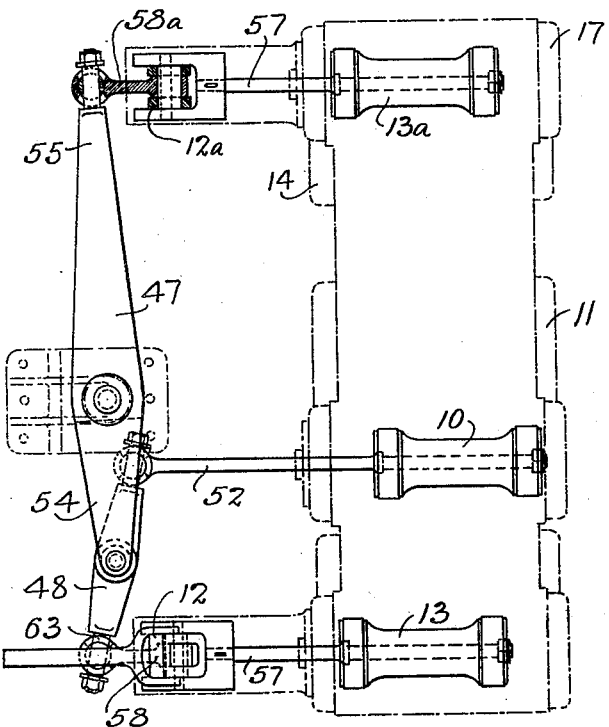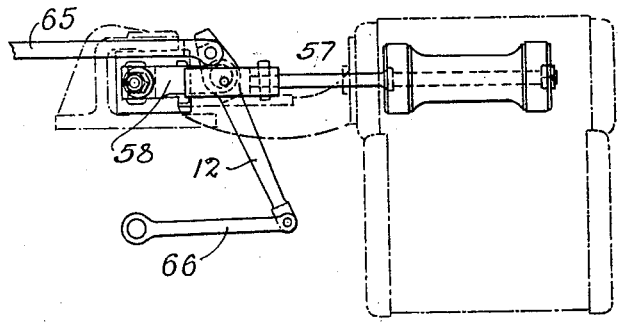

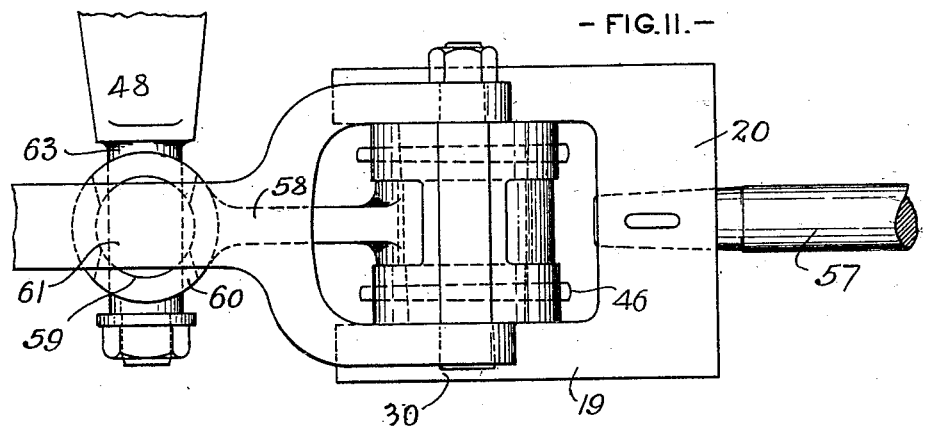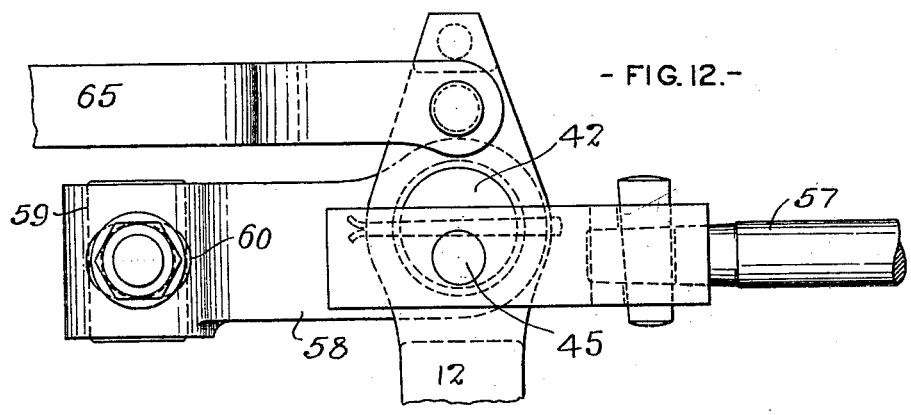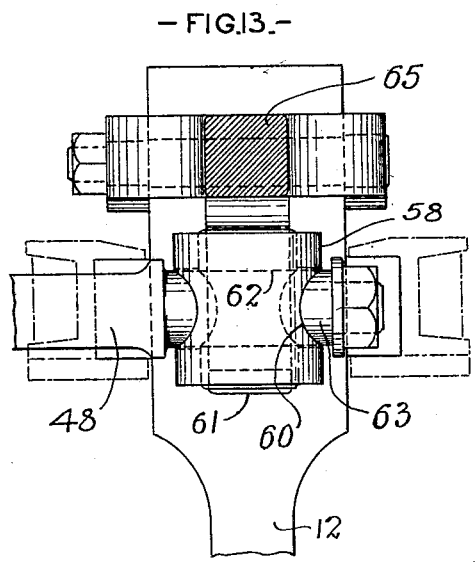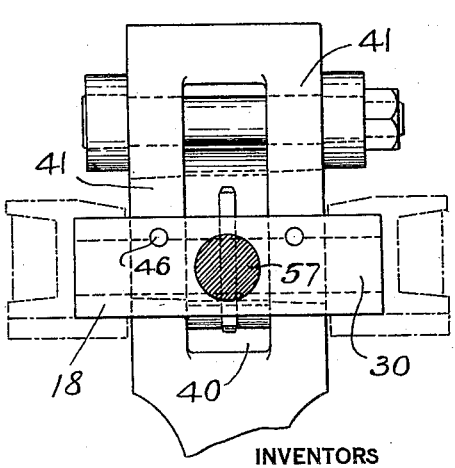

Patented May 2, 1933

1,906,482

UNITED STATES PATENT OFFICE

SHERMAN MILLER AND JOSHUA J. JONES, OF SCHENECTADY, NEW YORK

VALVE GEAR

Application filed April 1, 1930. Serial No. 440,808.

This invention relates generally to valve gear mechanisms for fluid pressure engines, and more particularly to such mechanisms adapted to operate the valve of an intermediate cylinder by the resultant of the movements of the combination levers for the valves of the side cylinders. The invention is especially useful for three cylinder locomotive engines of the compound type, but its application is not limited thereto.

An object of the present invention is to provide a valve gear mechanism of the type indicated which, while of simple construction, enables the distribution of pressure fluid to the intermediate cylinder to be varied from that of the side cylinders, so as to effect an efficient application of power to the crank axle, and a substantial economy in the use of steam.

A further object of the invention is to provide an easily accessible and convenient means for adjusting the setting of one valve without disturbing that of the others.

In compound engines of the three cylinder type, it is desirable to proportion the work done by the various cylinders in accordance with the requirements of the particular service the locomotive is called upon to perform. In large locomotives operating at high speeds, it is advantageous to reduce the power of the middle cylinder so as to decrease crank axle load. In compound engines especially, an economical use of steam can be effected by varying the distribution of power between the high and low pressure cylinders. The valve gears heretofore employed to obtain these results, have necessitated the use of separate gearing for the middle cylinder. In the present invention, the resultant of the motions of the combination levers which operate the valves of the side cylinders, is utilized to operate the distribution valve of the middle cylinder, and means are provided adapting the valves to effect dissimilar distribution of steam to the middle cylinder than to the side cylinders.

The improvement claimed is hereinafter fully set forth.

In the accompanying drawings: Figure 1 is a plan view, partly in horizontal section, showing a mechanism embodying the invention applied to the valves of a three cylinder locomotive; Fig. 2, a side view of the construction shown in Fig. 1, a portion being shown in longitudinal vertical section; Fig. 3, a front view of the long and short motion levers for operating the middle valve; Fig. 4, a top plan view, on an enlarged scale, showing the upper part of one of the combination levers and the valve operating mechanism associated therewith; Fig. 5, a longitudinal vertical section taken on the line V—V of Fig. 4; Fig. 6, a transverse vertical section taken on the line VI—VI of Fig. 5; Fig. 7, a front view of the mechanism shown in Fig. 4; Fig. 8, a top plan view, partly in horizontal section, showing a modified form of the invention; Fig. 9, a rear elevation of the long and short resultant motion levers shown in Fig. 8; Fig. 10, a side view in elevation of the construction shown in Fig. 8; Fig. 11, a top plan view on an enlarged scale of part of one of the combination levers and valve operating mechanism associated therewith shown in Fig. 8; Fig. 12, a side view in elevation of the construction shown in Fig. 11; and, Figs. 13 and 14, respectively, rear and front end elevations of the construction shown in Fig. 11.

In the practice of the invention, referring descriptively to the specific embodiments thereof which are herein exemplified, the distribution piston valve 10, for the middle cylinder 11 of a three cylinder locomotive, is connected to a pair of combination levers 12, 12a, so that its movement will be the resultant of the independent movements of the combination levers. The combination levers 12, 12a, are connected to their respective side distribution valves 13, 13a, which control the distribution of steam to the side cylinders 14 of the locomotive. The engine is of the compound type, the middle cylinder being high pressure and the side cylinders low pressure.

The valve gears for operating the side valves 13, 13a, are substantially similar, so that a description of one, which will now be given, will suffice for both. Referring principally to Figs. 1 to 7, the side distribution valve 13, is mounted on a tubular stem 15, adapted to slide through stuffing boxes 16, one at each end of a side valve chest 17. The rear end of the tubular valve stem is connected to a U-shape yoke 18, comprising spaced parallel arms 19, and a cross piece 20, connecting the arms at their forward ends. The cross piece is formed centrally with a bore 21, through which the rear end of the tubular stem 15 passes. The rear end of the tubular stem is formed with a screw thread 22, on which are threaded nuts 23, and 24, the nut 23, bearing against the forward face of the cross piece, and the nut 24, bearing against the rear face thereof. By suitably adjusting the nuts the desired setting of the valve can be effected. To provide for locking the nuts in adjusted position, their peripheries are formed with a plurality of notches 25, and a clamp 26, having lugs 27, adapted to engage in the notches, is secured to the cross piece by a threaded stud 28, carrying a nut 29. The yoke 18, is pivotally connected to the combination lever 12, by aligned trunnions 30, one projecting from each side of the lever, which trunnions fit in suitable bores 31, in the arms 19 of the yoke. From the foregoing description, it will be apparent that as the combination lever performs its usual back and forth movements, it will impart to the distibution valve 13, the desired back and forth movements.

To provide for imparting to the middle distribution valve 10, a movement dissimilar to that of the outside distribution valves, which movement of the middle distribution valve is the resultant of the independent movements of the combination levers, a pair of rods 32, 32a, one for each of the combination levers is employed. These rods are substantially similar, each comprising a rear section 33, which passes through the tubular valve stem 15 and is free to move relatively thereto; a front guide section 34, which is fitted to slide in a guide bearing 35; and a yoke 36, which connects the forward end of the rear section with the rear end of the forward section. The rear end of the rear section is tapered, and fitted in a complementally tapered socket 37, formed in a knuckle 38, and is secured in the socket by a tapered key 39, which key passes through aligned slots in the knuckle and the rod. To provide for pivotally connecting the knuckle to the combination lever 12, the lever is formed at its upper end with a recess or slot 40, in which the rear end of the knuckle is disposed, the lever having parallel side walls 41, each formed with a bore for the reception of one end of a bearing pin 42, which pin passes through a bore 43, in the knuckle, and is free to rotate therein.

In order to provide the pair of trunnions 30, for the combination lever 12, the bearing pin 42 is formed with a bore 44 eccentric of the axis of the pin 42, in which bore a pin 45 is fitted. The ends of the pin 45, project beyond each side of the combination lever forming the trunnions 30. It will be apparent from the foregoing description that the trunnions are in axial alignment with each other and are spaced or offset from the axis of the bearing pin 42, so that the rod 32, will have a movement dissimilar from that of the tubular valve stem 15 and thus will always effect a distribution of pressure fluid to the middle cylinder, unequal to that distributed to the outer cylinders.

Bearing pins 42 and 45 are held against rotation relatively to the combination lever by a pair of locking pins 46, one passing through each of the walls 41 of the lever and through both of the bearing pins.

To transmit the resultant of the independent movements of the rods 32, 32a, to the middle distribution valve 10, a mechanism of the type disclosed in patent to H. N. Gresley #1,529,996, issued March 17, 1925, is employed. This mechanism comprises a long lever 47, and a short lever 48. The short lever has its outer end pivotally connected to one end of a link 49, which link has its other end pivotally connected to the yoke 36, of the valve rod 32. The other end of the short lever is pivotally connected to one end of a link 50, which link has its other end pivotally connected to a yoke 51 of a valve rod 52, of the middle distribution valve 10. The long lever 47 is pivoted at a point disposed away from its center toward its inner end, to a bracket 53, which bracket may be rigidly secured to the locomotive in any suitable manner. The long lever 47, thus has a short arm 54 and a long arm 55. The outer end of the short arm 54, is pivotally connected to the short lever 48 centrally thereof, and the outer end of the long arm 55, is pivotally connected to one end of a link 56, which link has its other end pivotally connected to the yoke 36 of the valve rod 32a.

In Figs. 8 to 14 is illustrated a modified form of construction wherein instead of using tubular stems for the side distribution valves 13 and 13a, solid stems 57 are employed, and instead of using rods extending forwardly of the combination levers through the piston valves and valve chest, short rods 58, 58a, which extend rearwardly of the combination levers are employed. These short rods differ from the rods 32, 32a, at their rear ends in that each rear end is provided with a vertical bore 59, and transverse slots 60. A cylindrical bearing 61, is fitted in the bore 59, and is formed with a transverse bore 62 adapted to register with the transverse slots 60. The short lever 48 of the Gresley type has its outer end formed with a spindle 63 which projects through the slots 60 in the rear end of the rod and the bore 62 in the cylindrical bearing, thus a connection in the nature of a universal joint is formed between the outer end of the short lever and the rod 58. A similar connection is provided between the outer end of the long arm 55 of the long lever 47, and also between the inner end of the short lever 48 and the valve rod 52 for the middle distribution valve. The combination levers are shown as operable by a radius rod 65, and combination link 66, such as are used with the well known Walschaerts valve gear, but it is to be understood that the invention is not limited to such type of valve gear but may be used with any type of valve gear employing oscillatable valve moving members which are the equivalent of the combination levers of the Walschaerts valve gear.

While valves are shown of the piston type, it is to be understood that the invention is applicable to other types of valves, such as, for example, slide valves.

While the Gresley type of linkage has been described for transmitting the resultant movements of the rods 32, 32a, to the middle distribution valve 10, it is within the contemplation of the invention to use any other suitable mechanism for transmitting such resultant movement.

From the foregoing description, it will be apparent that the pair of combination levers will impart to the middle distribution valve, a movement effecting a distribution of fluid to the middle cylinder dissimilar to that which is effected to the side cylinders by their valves, and that by varying the eccentricity of the trunnions 30 relatively to the axis of the bearing pin 42, the motion of the the middle distribution valve may be varied from that of the side distribution valves, as desired, such adjustment of the position of the trunnions relative to the bearing being, of course, permanently made, in the manufacture of the device.

The invention enables the pressure fluid to be so distributed as to effect a substantial economy in the use thereof and the loads on the crank axle to be so proportioned as to increase the efficiency of operation.

While preferred forms of construction have been shown, it is obvious that many variations in procedure, form, arrangement and construction of the parts can be made, and the invention is not therefore limited to the particular embodiments disclosed, but includes such changes and modifications as come within the spirit and scope of the invention as set forth in the appended claims.

The invention claimed and desired to be secured by Letters Patent is:

1. In a fluid pressure engine, the combination of a plurality of cylinders; a valve chest for each cylinder; a valve in each of the valve chests; a member for effecting pressure fluid distributive movements of a plurality of the valves; means operatively connecting one of the valves to the member comprising a pivot at the member; and means operatively connecting another of the valves to the member comprising a second pivot at the member contiguous to the first pivot, the axis of one of the pivots being spaced from that of the other.

2. In a fluid pressure engine, the combination of a plurality of cylinders; a valve chest for each cylinder; a valve in each of the valve chests; a member for effecting pressure fluid distributive movements of a plurality of the valves; means operatively connecting one of the valves to the member comprising a pivot at the member; and means operatively connecting another of the valves to the member comprising a second pivot at the member contiguous to the first pivot, the axis of one of the pivots being parallel to and spaced from that of the other.

3. In a multi-cylinder fluid pressure engine, the combination of two side cylinders; a distribution valve for each side cylinder; a cylinder disposed intermediate the side cylinders; a distribution valve therefor; combination levers, one for each side cylinder distribution valve; means comprising pivots operatively connecting each combination lever to its companion side cylinder distribution valve; and means comprising pivots contiguous to the first mentioned pivots and having their axes spaced from the axes of the first mentioned pivots operatively connected to both combination levers and to the intermediate cylinder distribution valve adapted to impart to the intermediate cylinder distribution valve a movement effecting a distribution of pressure fluid to the intermediate cylinder dissimilar to that effected to the side cylinders by their distribution valves.

4. In a multi-cylinder fluid pressure engine, the combination of two side cylinders; a distribution valve for each side cylinder; a cylinder disposed intermediate the side cylinders; a distribution valve therefor; two independently movable combination levers, one for each side cylinder distribution valve; means comprising pivots connecting each combination lever to its companion side cylinder distribution valve; and means comprising pivots contiguous to the first mentioned pivots and having their axes spaced from the axes of the first mentioned pivots operatively connected to both combination levers and to the intermediate cylinder distribution valve, adapted to impart to the intermediate cylinder distribution valve a movement which is the resultant of the independent movements of the combination levers, effecting a distribution of pressure fluid to the intermediate cylinder dissimilar to that effected to the side cylinders by their distribution valves.

5. In a fluid pressure engine, the combination of a plurality of cylinders; a valve chest for each of the cylinders; a valve in each of the valve chests; a member for effecting pressure fluid distributive movements of a plurality of the valves; a tubular valve stem for one of the valves; a pivot connecting the tubular valve stem to the member; a valve operating rod passing through, and adapted to move relatively to, the tubular valve stem; means connecting the valve rod to another of the valves; and a pivot connecting the valve rod to the member, the axis of one of the pivots being spaced from that of the other.

6. In a fluid pressure engine, the combination of a plurality of cylinders; a valve chest for each of the cylinders; a valve in each of the valve chests; a member for effecting pressure fluid distributive movements of a plurality of the valves; a tubular valve stem for one of the valves; a pivot connecting the tubular valve stem to the member; a valve operating rod passing through, and adapted to move relatively to, the tubular valve stem; means connecting the valve rod to another of the valves; and a pivot connecting the valve rod to the member, the axis of one of the pivots being spaced from and parallel to the other.

7. In a fluid pressure engine, the combination of a plurality of cylinders; a valve chest for each cylinder; a valve in each of the valve chests; a combination lever; actuating means connected to said lever; pivot means associated with said lever in spaced relation to said actuating means; means connecting said pivot means to one of said valves for operating said valve; a second pivot means passed through the first mentioned pivot means and projecting at the opposite sides thereof; and means connecting said second pivot means at said opposite sides with another of said valves for operating said other valve, the axis of the first mentioned pivot means being spaced from the axis of the second mentioned pivot means.

8. In a fluid pressure engine, the combination of a plurality of cylinders; a valve chest for each cylinder; a valve in each of the valve chests; a combination lever; actuating means connected to said lever; a pivot engaging said lever; means connecting said pivot with one of said valves for operating the same; a second pivot carried by the first said pivot within the circumference thereof and having its axis spaced from the axis of the first said pivot; and means connecting said second pivot to another of said valves for operating said other valve.

9. In a fluid pressure engine the combination of a plurality of cylinders; a valve chest for each cylinder; a valve in each of the valve chests; a combination lever having two pivot pins, one of said pivot pins being carried by the other pivot pin and having its axis eccentric to the axis of said other pivot pin; means connecting one of said pivot pins to one of said valves for operating said valve; means connecting the other of said pivot pins with another of said valves for operating said other valve; and actuating means connected to said combination lever.

10. In a multi-cylinder fluid pressure engine, the combination of two side cylinders; a distribution valve for each side cylinder; a stem for each of said valves; a cylinder disposed intermediate said side cylinders; a distribution valve therefor; a stem for said last mentioned valve; two combination levers; a pivot connecting the valve stem of each side cylinder distribution valve to one of the combination levers; and means connecting the valve stem of the intermediate distribution valve to each of the combination levers, comprising a plurality of resultant motion levers, means comprising a pivot connecting one of the resultant motion levers to one of the combination levers, means comprising a pivot connecting another of the resultant motion levers to the other combination lever, the pivot for the resultant motion lever and the pivot for the side cylinder valve stem, for each combination lever, being contiguous to each other and having their axes spaced one from the other.

11. In a multi-cylinder fluid pressure engine, the combination of two side cylinders; a distribution valve for each side cylinder; a stem for each of said valves; a cylinder disposed intermediate said side cylinders; a distribution valve therefor; a stem for said last mentioned valve; two combination levers; a pivot connecting the valve stem of each side cylinder distribution valve to one of the combination levers; and means connecting the valve stem of the intermediate distribution valve to each of the combination levers, comprising a long lever and a short lever; a pivot for connecting the long lever to one of the combination levers; and a pivot for connecting the short lever to the other combination lever, the axis of the pivot for connecting the long lever to one combination lever, and the axis of the pivot for connecting one of the side cylinder valve stems to that lever being spaced apart, the axis of the pivot for connecting the short lever to the other combination lever and the axis of the pivot connecting the other side cylinder valve stem to that lever being spaced apart, and the pivots for each combination lever being contiguous to each other.

12. In a fluid pressure engine, the combination of a plurality of cylinders; a valve chest for each cylinder; a valve in each of the valve chests; and a combination lever for actuating said valves, said lever comprising means at one end for connection to an actuating member, means at the other end for connection to another actuating member, and a plurality of pivot pins disposed intermediate said ends having their axes spaced one from the other, one of said pins being operatively connected to one of said valves, and another of said pins being operatively connected to another of said valves.

13. In a fluid pressure engine, the combination of a plurality of cylinders; a valve chest for each cylinder; a valve in each of the valve chests; and a combination lever for actuating said valves, said lever comprising means at one end for connection to an actuating member, means at the other end for connection to another actuating member, and a plurality of pivot pins disposed intermediate said ends having their axes spaced one from the other, and parallel to each other, one of said pins being operatively connected to one of said valves, and another of said pins being operatively connected to another of said valves.

SHERMAN MILLER.
JOSHUA J. JONES.